US012755916B2

(12) United States Patent
Iwasaka et al.

(10) Patent No.: US 12,755,916 B2
(45) Date of Patent: Oct. 6, 2026

(54) ELECTROMAGNETIC RELAY

(71) Applicant: OMRON Corporation, Kyoto (JP)

(72) Inventors: Hiroyuki Iwasaka, Kyoto (JP); Takeshi Nishida, Kyoto (JP); Ryota Minowa, Kyoto (JP); Shinichi Ogawa, Kyoto (JP); Kohei Otsuka, Kyoto (JP); Ayata Horie, Kyoto (JP)

(73) Assignee: OMRON CORPORATION, Kyoto (JP)

(*) Notice: Subject to any disclaimer, the term of this patent is extended or adjusted under 35 U.S.C. 154(b) by 272 days.

(21) Appl. No.: 18/547,510

(22) PCT Filed: Jan. 18, 2022

(86) PCT No.: PCT/JP2022/001497
§ 371 (c)(1),
(2) Date: Aug. 23, 2023

(87) PCT Pub. No.: WO2022/185748
PCT Pub. Date: Sep. 9, 2022

(65) Prior Publication Data

US 2024/0145195 A1 May 2, 2024

(30) Foreign Application Priority Data

Mar. 5, 2021 (JP) ................................ 2021-035747

(51) Int. Cl.
*H01H 50/14* (2006.01)
*H01H 50/02* (2006.01)

(52) U.S. Cl.
CPC ............ *H01H 50/14* (2013.01); *H01H 50/02* (2013.01)

(58) Field of Classification Search
CPC ................................ H01H 50/14; H01H 45/14
(Continued)

(56) References Cited

U.S. PATENT DOCUMENTS 3,134,932 A * 5/1964 Ray ........................... H01F 7/12 335/251
3,775,730 A * 11/1973 Rowls ................. H01M 50/567 439/765
(Continued)

FOREIGN PATENT DOCUMENTS

JP 2002-42626 A 2/2002
JP 2014-49208 A 3/2014
(Continued)

OTHER PUBLICATIONS

International Search Report of International Application No. PCT/JP2022/001497 issued on Mar. 29, 2022.
(Continued)

*Primary Examiner* — Alexander Talpalatski
(74) *Attorney, Agent, or Firm* — SHINJYU GLOBAL IP

(57) ABSTRACT

An electromagnetic relay includes a case, a fixed terminal, and a female screw member. The fixed terminal includes an external connecting portion. The external connecting portion has a screw insertion hole, exposed to the outside from the case, and configured to be screwed to an external terminal. The female screw member is prevented from rotating by the case. The case includes a held portion that is held between the external connecting portion of the fixed terminal and the female screw member in a direction of penetration of the screw insertion hole, the direction of penetration including a first direction from the external connecting portion toward the female screw member and a second direction from the female screw member toward the external connecting portion.

11 Claims, 6 Drawing Sheets

(58) Field of Classification Search
USPC .................................. 335/131; 439/779, 813
See application file for complete search history.

(56) References Cited

U.S. PATENT DOCUMENTS

| | | | | | |
|---|---|---|---|---|---|
| 3,815,060 | A * | 6/1974 | Turnbull | H01H 50/546 | 335/133 |
| 3,964,006 | A * | 6/1976 | Lacan | H01H 50/22 | 335/132 |
| 4,231,631 | A * | 11/1980 | Guerinault | H01M 50/529 | 439/559 |
| 4,293,835 | A * | 10/1981 | Davis | H01H 51/065 | 335/131 |
| 4,404,533 | A * | 9/1983 | Kurihara | H01H 51/065 | 335/131 |
| 4,521,758 | A * | 6/1985 | Krubsack | H01H 51/065 | 335/131 |
| 4,637,267 | A * | 1/1987 | Mazzorana | H01H 51/065 | 335/131 |
| 4,862,123 | A * | 8/1989 | Gray | H01H 50/443 | 335/131 |
| 6,234,850 | B1 * | 5/2001 | Pandit | H01R 4/34 | 439/813 |
| 6,404,310 | B1 * | 6/2002 | Ando | H01H 50/14 | 335/133 |
| 7,639,108 | B2 * | 12/2009 | Miyake | H01H 50/14 | 335/131 |
| 9,378,914 | B2 * | 6/2016 | Isozaki | H01H 71/10 | |
| 11,699,864 | B2 * | 7/2023 | Harimochi | H01H 50/12 | 439/620.01 |
| 2019/0066956 | A1 | 2/2019 | Konishi et al. | | |

FOREIGN PATENT DOCUMENTS

| | | | |
|---|---|---|---|
| JP | 2015-176810 | A | 10/2015 |
| WO | 2018/146822 | A1 | 8/2018 |

OTHER PUBLICATIONS

Written Opinion of the International Searching Authority of International Application No. PCT/JP2022/001497 issued on Mar. 29, 2022.

* cited by examiner

ELECTROMAGNETIC RELAY

CROSS-REFERENCE TO RELATED APPLICATION

This application is the U.S. National Phase of International Application No. PCT/JP2022/001497, filed on Jan. 18, 2022. This application claims priority to Japanese Patent Application No. 2021-035747, filed Mar. 5, 2021. The contents of those two applications are incorporated by reference herein in their entireties.

FIELD

The claimed invention relates to electromagnetic relays.

BACKGROUND

Conventionally, an electromagnetic relay for opening and closing an electric circuit is known. The electromagnetic relay has a fixed terminal configured to be connected to an external terminal. For example, the fixed terminal disclosed in Japanese Patent Application Publication No. 2014-049208 includes a cylindrical terminal and a plate terminal fixed to the cylindrical terminal. The plate terminal is connected to the external terminal by screw fastening.

In the electromagnetic relay of Japanese Patent Application Publication No. 2014-049208, when an external force is applied to the external terminal by screws or an accidental external force is applied to the external terminal, the plate terminal may be deformed and the function of the electromagnetic relay may be impaired.

SUMMARY

The claimed invention provides an electromagnetic relay in which the deformation of fixed terminal due to external force is decreased.

An electromagnetic relay according to one aspect of the claimed invention includes a case, a fixed terminal, and a female screw member. The fixed terminal has a plate-like shape. The fixed terminal includes an external connecting portion. The external connecting portion has a screw insertion hole, is exposed to the outside from the case, and configured to be screwed to an external terminal. The female screw member is a member for screwing the external connecting portion to the external terminal. The female screw member is prevented from rotation by the case. The case includes a held portion to be held between the external connecting portion of the fixed terminal and the female screw member in a direction of penetration of the screw insertion hole, the direction of penetration including a first direction from the female screw member toward the external connecting portion and a second direction from the external connecting portion toward the female screw member.

In this electromagnetic relay, the held portion of the case is held between the external connecting portion of the fixed terminal and the female screw member in the direction of penetration of the screw insertion hole. Thus, the external terminal, the fixed terminal, and the case are fastened together when the external terminal is screwed to the external connecting portion of the fixed terminal. With the configuration, the held portion increases the strength of the fixed terminal, and thereby deformation of the fixed terminal due to external force can be decreased. Also, the female screw member becomes less likely to come off from the case.

The female screw member may include a flange portion having an outer diameter larger than an outer diameter of an end surface of the female screw member in the first direction. The held portion of the case may be sandwiched between the external connecting portion of the fixed terminal and the flange portion of the female screw member in the direction of penetration of the screw insertion hole. In this case, the held portion is increased in size, and thereby the strength of the fixed terminal is further improved. Also, when an external terminal is screwed to the external connecting portion, damage to the case due to overtightening of the screw can be reduced.

The female screw member may have an end surface exposed to the outside from the case in the second direction. In this case, for example, the heat generated at the fixed terminal when energized can be released to the outside through the female screw member.

The case may include a case body and an outer support portion located outside the case body to be in contact with the external connecting portion. The female screw member may be positioned on the outer support portion. In this case, the external connecting portion can be supported by the outer support portion.

The external connecting portion of the fixed terminal may include a first surface contacting the held portion, a second surface opposite the first surface, and a side surface between the first surface and the second surface. The sides may be, at least partially, held by the outer support of the case. In this case, the fixed terminal can be held firmly.

The outer support portion of the case may include a retaining groove to retain the female screw member therein. The retaining groove may have an opening to insert to the female screw. The opening may be opened in a direction intersecting the direction of penetration of the screw insertion hole. In this case, the female screw member can be held by the case by a means different from insert molding.

The case may be comprised of resin. In this case, the female screw member can be fixed to the case by insert molding.

DETAILED DESCRIPTION

Figure 1:
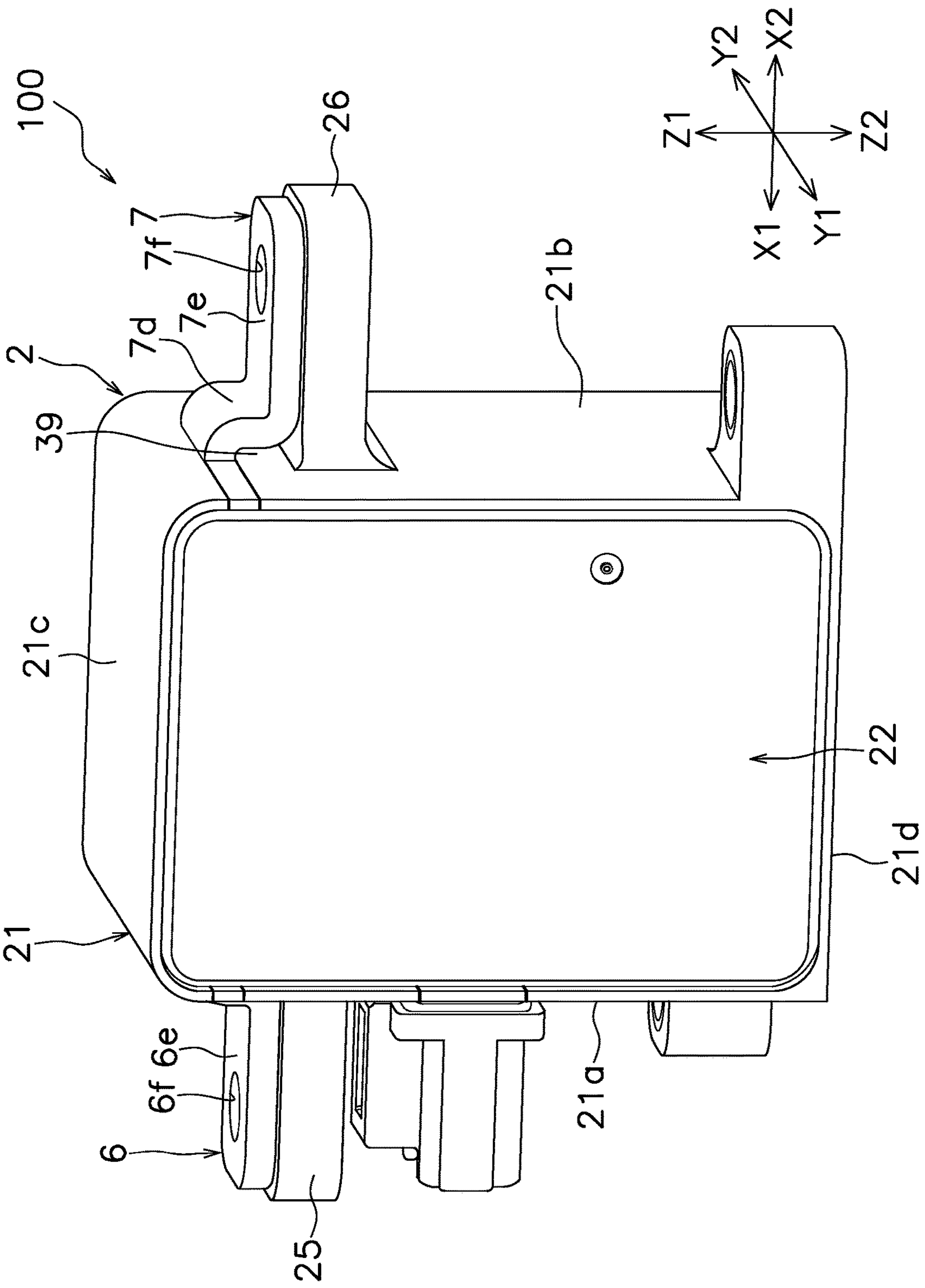
FIG. 1 is a perspective view of an electromagnetic relay in accordance with the claimed invention.

An embodiment of an electromagnetic relay 100 according to one aspect of the claimed invention will be described below with reference to the drawings. When referring to the drawings in the description below, the X1 direction is the leftward direction, the X2 direction is the rightward direction, the Y1 direction is the forward direction, the Y2 direction is the rearward direction, the Z1 direction is the upward direction, and the Z2 direction is the downward direction. These directions are defined for convenience of description, and do not limit the directions in which the electromagnetic relay 100 is arranged. In the present embodiment, the Z1 direction is an example of a first direction, and the Z2 direction is an example of a Second direction.

Figure 2:
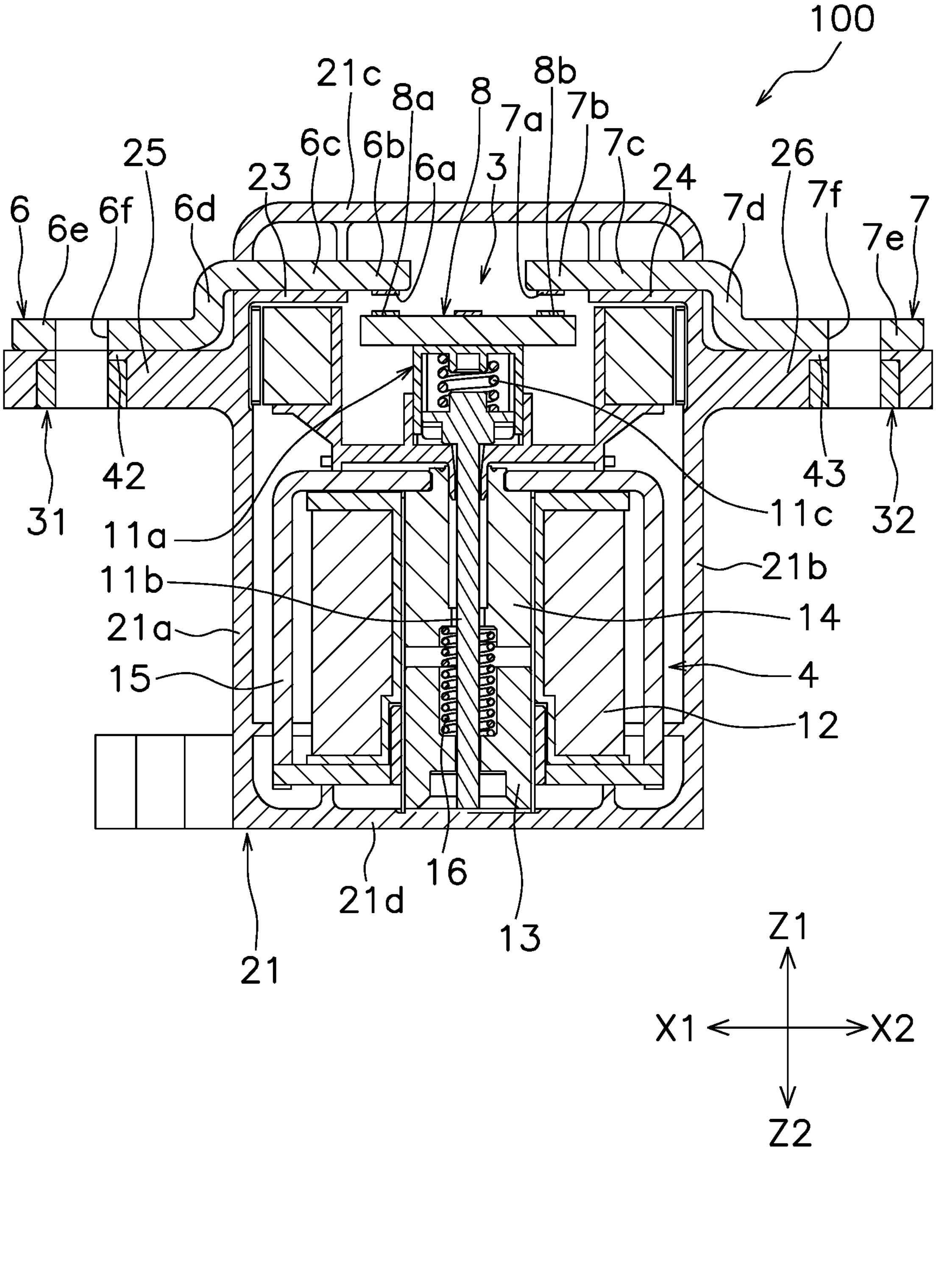
FIG. 2 is a cross-sectional view of the electromagnetic relay illustrated in FIG. 1.

As shown in FIGS. 1 and 2, the electromagnetic relay 100 includes a case 2, a contact device 3, and a driving device 4.

The case 2 is a generally rectangular box in shape and is comprised of insulating material such as resin. In the present embodiment, the case 2 is comprised of resin. The case 2 includes a case body 21, a lid 22, inner support portions 23, 24, and outer support portions 25, 26.

The case body 21 has an opening at the front. The case body 21 includes a left wall 21*a*, a right wall 21*b*, an upper wall 21*c*, a lower wall 21*d*, and a rear wall (not shown). The left wall 21*a* and right wall 21*b* extend in the front-rear direction and the up-down direction. The left wall 21*a* faces the right wall 21*b* in the left-right direction. The upper wall 21*c* and the lower wall 21*d* extend in the front-rear direction and the left-right direction. The upper wall 21*c* faces the lower wall 21*d* in the up-down direction. The rear wall extends in the left-right direction and the up-down direction. The rear wall is connected to the left wall 21*a*, the right wall 21*b*, the upper wall 21*c* and the lower wall 21*d*. The lid 22 is attached to the case body 21 so as to close the opening of the case body 21.

The inner support portion 23 protrudes rightward from an inner surface of the left wall 21*a*. The inner support portion 24 protrudes leftward from an inner surface of the right wall 21*b*. The inner support portions 23, 24 each have a flat upper surface. That is, the upper surfaces of the inner support portions 23, 24 include a plane perpendicular to the up-down direction.

The outer support portion 25 is disposed outside the case body 21. The outer support portion 25 protrudes leftward from an outer surface of the left wall 21*a*. The outer support portion 25 is disposed below the inner support portion 23. The outer support portion 26 protrudes rightward from an outer surface of the right wall 21*b*. The outer support portion 26 is disposed below the inner support portion 24. The outer support portions 25 and 26 each have a flat upper surface. That is, the upper surfaces of the outer support portions 25 and 26 include a plane perpendicular to the up-down direction.

The contact device 3 includes fixed terminals 6 and 7 and a movable contact piece 8. The fixed terminals 6 and 7 may be plate terminals and are comprised of conductive material. The fixed terminals 6 and 7 extend in the left-right direction and have a bent shape. The fixed terminals 6 and 7 extend across the interior and exterior of the case 2. The fixed terminals 6 and 7 are arranged apart from each other in the left-right direction. The fixed terminals 6 and 7 are held by the case 2.

The fixed terminal 6 includes a fixed contact 6*a*, a contact support portion 6*b*, an extension portion 6*c*, a bent portion 6*d*, an external connecting portion 6*e*, and a screw insertion hole 6*f*. The fixed contact 6*a* is disposed inside the case 2. The fixed contact 6*a* is disposed facing the movable contact piece 8 in the up-down direction. The fixed contact 6*a* is disposed on the lower surface of the contact support portion 6*b*. The contact support portion 6*b* supports the fixed contact 6*a*.

The extension portion 6*c* extends leftward from the contact support portion 6*b*. The extension portion 6*c* is supported on the upper surface of the inner support portion 23. The bent portion 6*d* is arranged outside the case 2. The bent portion 6*d* is connected to the extension portion 6*c*. The bent portion 6*d* extends in the up-down direction. The bent portion 6*d* extends in a bending form in the Z2 direction from the left end of the extension portion 6*c*.

The external connecting portion 6*e* is exposed to the outside from the case 2. The external connecting portion 6*e* is connected to the bent portion 6*d*. The external connecting portion 6*e* extends leftwards from the bent portion 6*d*. The external connecting portion 6*e* is to be in contact with the upper surface of the outer support portion 25. The external connecting portion 6*e* is to be connected to an external terminal 30 (see FIG. 3) such as a busbar by screwing.

The screw insertion hole 6*f* is located in the external connecting portion 6*e*. The screw insertion hole 6*f* penetrates through the external connecting portion 6*e* in the up-down direction. In the present embodiment, the direction of penetration of the screw insertion hole 6*f* coincides with the up-down direction. Thus, the direction of penetration of the screw insertion hole 6*f* encompasses the Z1 direction from the female screw member 31 to the external connecting portion 6*e* and the Z2 direction from the external connecting portion 6*e* to the female screw member 31, which will be described later.

The fixed terminal 7 is bilaterally symmetric with the first fixed terminal 6, so detailed description thereof will be omitted. The fixed terminal 7 includes a fixed contact 7*a*, a contact support portion 7*b*, an extending portion 7*c*, a bent portion 7*d*, an external connecting portion 7*e*, and a screw insertion hole 7*f*. The fixed contact 7*a* is arranged to face the movable contact piece 8 in the up-down direction at a position spaced from the fixed contact 6*a* in the left-right direction. The contact support portion 7*b* supports the fixed contact 7*a*. The extending portion 7*c* is supported on the upper surface of the inner support portion 24. The bent portion 7*d* extends in the up-down direction outside the case 2. The external connecting portion 7*e* extends in the left-right direction and is supported on the upper surface of the outer support portion 26. The external connecting portion 7*e* is to be connected to an external terminal (not shown) such as a busbar by screwing. The screw insertion hole 7*f* penetrates through the external connecting portion 7*e* in the up-down direction.

The movable contact piece 8 is a plate terminal elongated in one direction and comprised of conductive material. The movable contact piece 8 is located inside the case 2. The movable contact piece 8 extends in the left-right direction inside the case 2.

The movable contact piece 8 includes movable contacts 8*a*, 8*b*. The movable contact 8*a* is disposed to face the fixed contact 6*a*. The movable contact 8*b* is disposed to face the fixed contact 7*a*.

The movable contact piece 8 is movable in the up-down direction. That is, the movable contact piece 8 is movable in the Z1 direction and the Z2 direction. In the present embodiment, the Z1 direction coincides with the direction from the movable contact 8*a* toward the fixed contact 6*a*. The Z2 direction coincides with the direction from the fixed contact 6*a* toward the movable contact 8*a*.

The driving device 4 is positioned inside the case 2. The driving device 4 is configured to move the movable contact piece 8 in the Z1 direction and the Z2 direction. The driving device 4 includes a movable mechanism 11, a coil 12, a movable iron core 13, a fixed iron core 14, a yoke 15, and a return spring 16.

Figure 4:
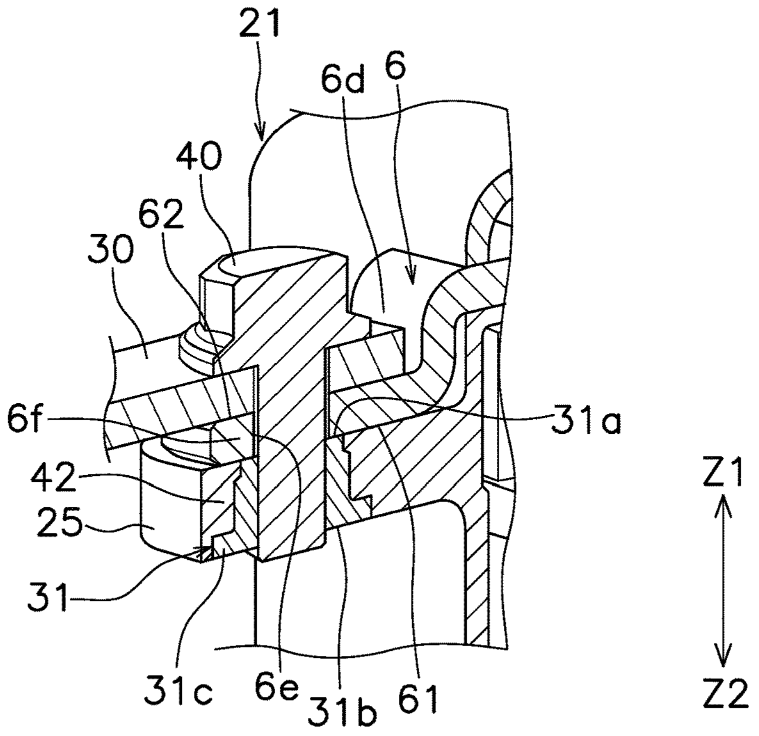
FIG. 4 is a cross-sectional perspective view of a female screw member and surrounding components according to a first modification.

The movable mechanism 11 is connected to the movable contact piece 8. As shown in FIG. 4, the movable mechanism 11 includes a holder 11*a*, a drive shaft 11*b*, and a contact spring 11*c*. The holder 11*a* holds the movable contact piece 8. The holder 11*a* is configured to move integrally with the movable contact piece 8. The drive shaft 11*b* extends in the up-down direction. The drive shaft 11*b* is arranged below the movable contact piece 8. The drive shaft 11*b* is connected to the holder 11*a* so as to be relatively movable in the up-down direction with respect to the holder 11*a*. The contact spring 11*c* is arranged between the holder 11*a* and the drive shaft 11*b*. The contact spring 11*c* urges the movable contact piece 8 in the Z1 direction via the holder 11*a*.

When a voltage is applied to the coil 12 to excite it, the coil 12 generates an electromagnetic force that causes the movable iron core 13 to move in the Z1 direction. The movable iron core 13 is fixed to the drive shaft 11*b* so as to be movable integrally therewith. The fixed iron core 14 is disposed above the movable iron core 13 so as to face the movable iron core 13. The yoke 15 is arranged to surround the coil 12. The yoke 15 is connected to the fixed iron core 14. The return spring 16 urges the movable iron core 13 in the Z2 direction.

The electromagnetic relay 100 further includes a female screw member 31. The female screw member 31 is supported by the case 2. The female screw member 31 is a member for screwing the external connecting portion 6*e* to the external terminal 30. The female screw member 31 in the present embodiment is, for example, a hexagonal nut. The female screw member 31 is prevented from rotating by the case 2. In the present embodiment, the female screw member 31 is fixed to the case 2 by insert molding.

Figure 3:
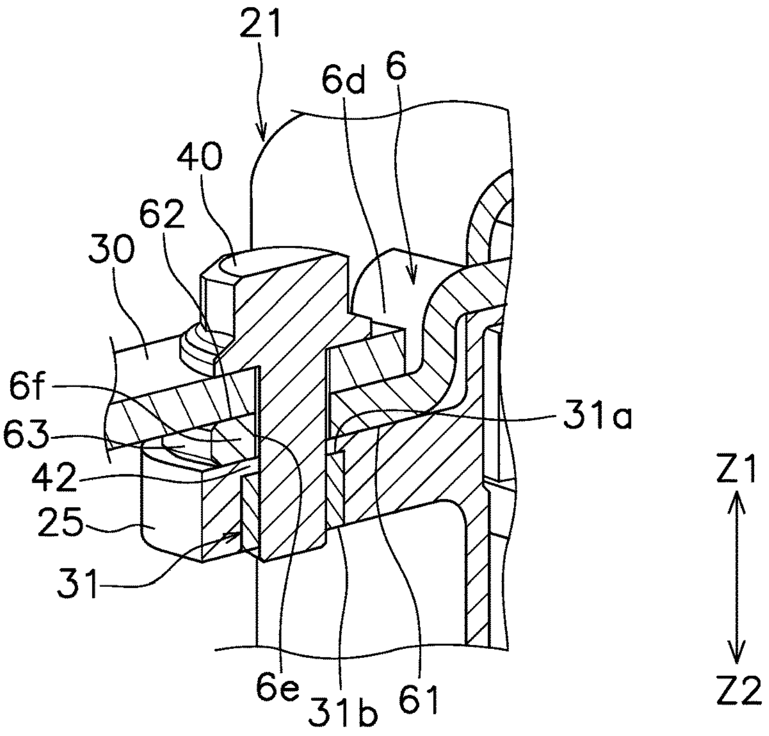
FIG. 3 is a cross-sectional perspective view of a female screw member and surrounding components.

FIG. 3 is a cross-sectional perspective view of the female screw member 31 and the region around it. As shown in FIGS. 2 and 3, the female screw member 31 is positioned in the outer support portion 25. The female screw member 31 is embedded in the outer support portion 25. The female screw member 31 overlaps the external connecting portion 6*e* when viewed from the direction of penetration of the screw insertion hole 6*f*. As shown in FIG. 3, the female screw member 31 is to be screwed to a male screw member 40 that is inserted through the screw insertion hole 6*f*. The male screw member 40 may, for example, be a bolt.

The female screw member 31 is in contact with the external connecting portion 6*e* via the outer support portion 25 in the direction of penetration of the screw insertion hole 6*f*. Specifically, the case 2 further includes a held portion 42. The held portion 42 is held between the external connecting portion 6*e* and the female screw member 31 in the direction of penetration of the screw insertion hole 6*f*. The held portion 42 extends in the up-down direction. The held portion 42 is constituted by part of the outer support portion 25. The held portion 42 overlaps the external connecting portion 6*e* and the female screw member 31 in the direction of penetration of the screw insertion hole 6*f*. The held portion 42 is pressed in the Z1 and Z2 directions when the external connecting portion 6*e* is screwed to the external terminal 30. The held portion 42 may be pressed in the Z2 direction by the external connecting portion 6*e* when the external connecting portion 6*e* is not screwed to the external terminal 30.

The female screw member 31 includes end surfaces 31*a* and 31*b*. The end surface 31*a* is the end surface in the Z1 direction and is in contact with the held portion 42. The end surface 31*b* is an end surface in the Z2 direction and is exposed to the outside from the external connecting portion 6*e* of the case 2. The end surface 31*b* is arranged flush with the lower surface of the external connecting portion 6*e*.

The external connecting portion 6*e* includes a first surface 61, a second surface 62 opposite the first surface 61, and a side surface 63 between the first surface 61 and the second surface 62. The first surface 61 is the lower surface of the external connecting portion 6*e* and is in contact with the outer support portion 25 and the held portion 42. The second surface 62 is the upper surface of the external connecting portion 6*e* and is in contact with the external terminal 30.

In the electromagnetic relay 100 configured as described above, the held portion 42 of the case 2 is held between the external connecting portion 6*e* of the fixed terminal 6 and the female screw member 31 in the direction of penetration of the screw insertion hole 6*f*. Thus, when the external terminal is screwed to the external connecting portion 6*e* of the fixed terminal 6, the external terminal 30, the fixed terminal 6 and the case 2 are fastened together. With the configuration, the held portion 42 increases the strength of the fixed terminal 6, thereby decreasing the deformation of the fixed terminal 6 due to external force. In addition, the female screw member 31 becomes less likely to come off from the case 2.

Note that the electromagnetic relay 100 further includes a female screw member 32, as shown in FIG. 2. The case 2 further includes a held portion 43. The held portion 43 is held between the external connecting portion 7*e* and the female screw member 32 in the direction of penetration of the screw insertion hole 7*f*. Thus, when an external terminal (not shown) is screwed to the external connecting portion 7*e* of the fixed terminal 7, the external terminal, the fixed terminal 7 and the case 2 are fastened together.

An embodiment of the electromagnetic relay according to one aspect of the claimed invention has been described above, but the claimed invention is not limited to the above embodiment, and various modifications can be made without departing from the scope of the invention.

FIG. 4 is a cross-sectional perspective view illustrating a female screw member 31 and the surrounding region according to a first modification. The female screw member 31 includes a flange portion 31*c*. The flange portion 31*c* has an outer diameter greater than the outer diameter of the end surface 31*a* of the female screw member 31. The flange portion 31*c* includes an end surface 31*b*. The flange portion 31*c* is in contact with the held portion 42 in the direction of penetration of the screw insertion hole 6*f*. The held portion 42 is held between the external connecting portion 6*e* and the flange portion 31*c* in the direction of penetration of the screw insertion hole 6*f*. In the first modification, the end surface 31*a* is in contact with the first surface 61 of the external connecting portion 6*e*. Note that the end surface 31*a* does not have to be in contact with the first surface 61.

Figure 5:
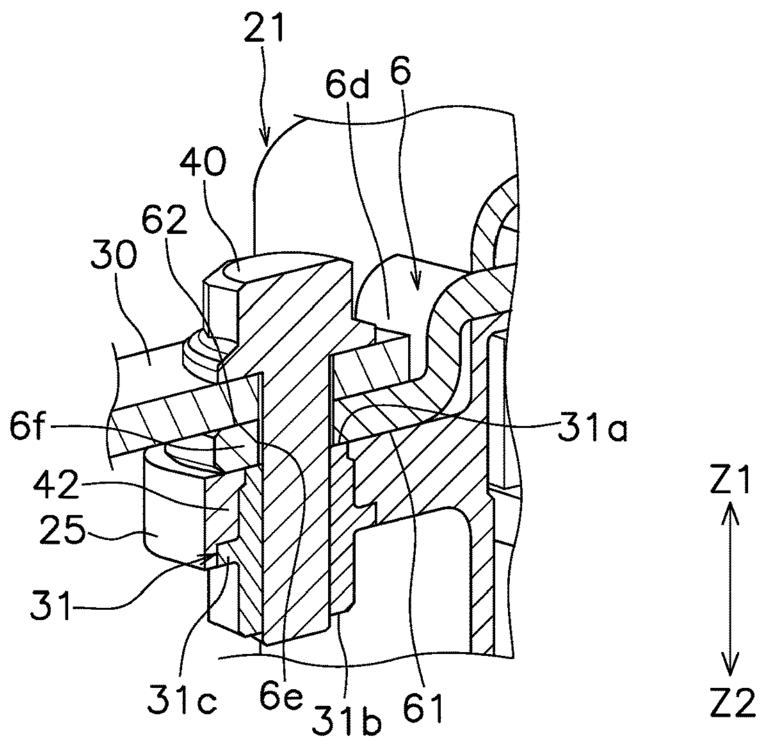
FIG. 5 is a cross-sectional perspective view of a female screw member and surrounding components according to a second modification.

FIG. 5 is a cross-sectional perspective view illustrating the female screw member 31 and the surrounding region according to a second modification. In the second modification, the female screw member 31 protrudes in the Z2 direction beyond the outer support portion 25. The threaded hole of the female screw member 31 protrudes in the Z2 direction beyond the outer support portion 25. That is, the lower portion of the female screw member 31 is exposed to the outside from the external connecting portion 6*e*. Other configurations are similar to those of the first modification.

Figure 6:
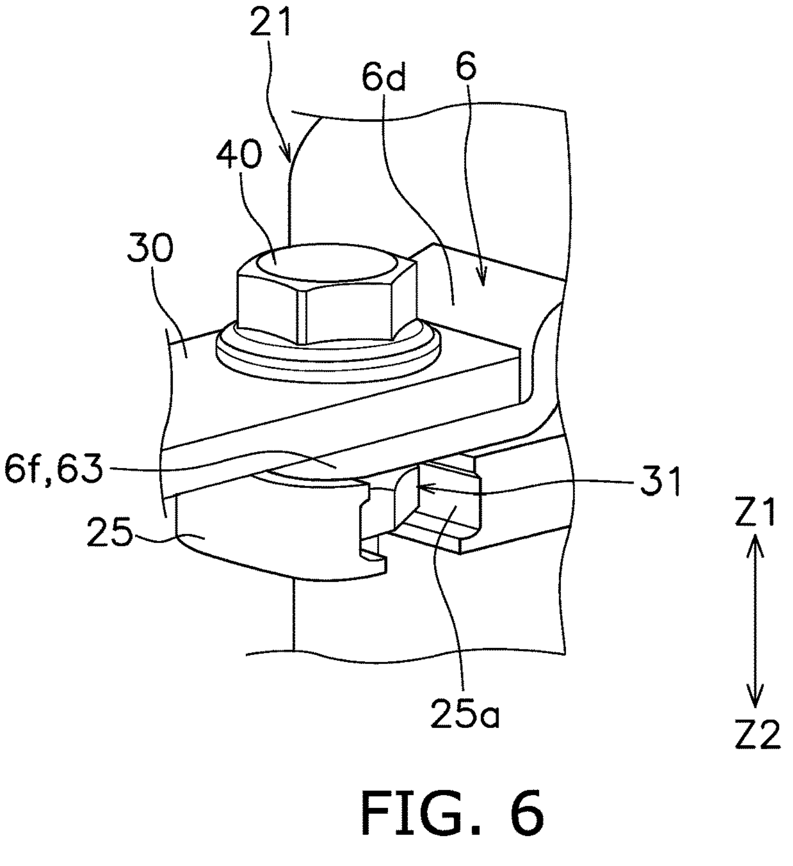
FIG. 6 is a perspective view of a female screw member and surrounding components according to a third modification.
Figure 7:
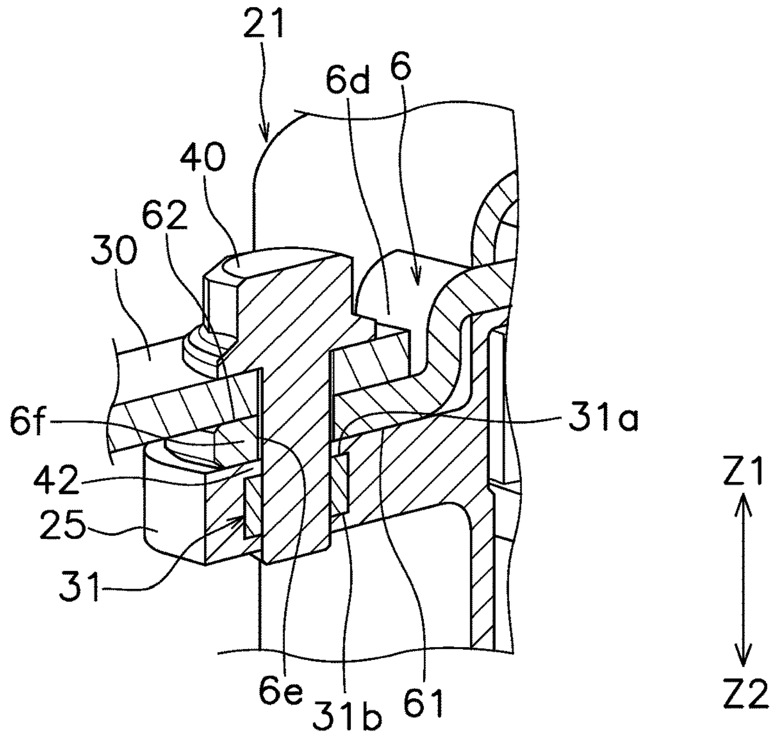
FIG. 7 is a cross-sectional perspective view of a female screw member and surrounding components according to the third modification.

FIG. 6 is a perspective view illustrating the female screw member 31 and the surrounding region according to a third modification. FIG. 7 is a cross-sectional perspective view of the female screw member 31 and the surrounding region according to the third modification. In the third modification, the outer support portion 25 includes a retaining groove 25*a*. The retaining groove 25*a* retains the female screw member 31 from rotating. The female screw member 31 is inserted into the retaining groove 25*a* from a direction intersecting the direction of penetration of the screw insertion hole 6*f*. Here, the retaining groove 25*a* is open forward, and the female screw member 31 is inserted from the front. The end surface 31*b* of the female screw member 31 is supported by the retaining groove 25*a*. Thus, the end surface 31*b* of the female screw member 31 is, at least partially, covered with the retaining groove 25*a*.

Figure 8:
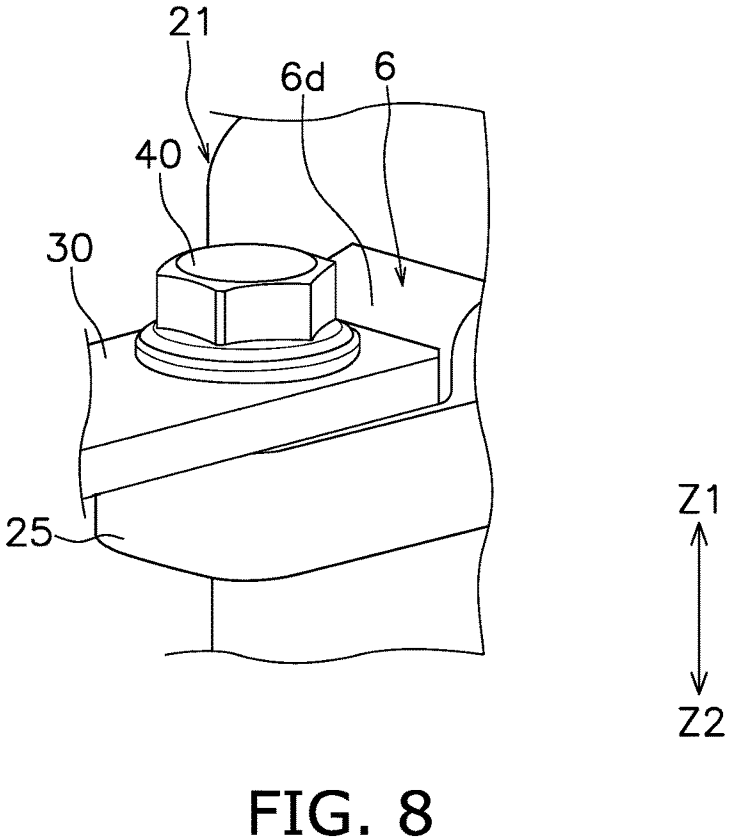
FIG. 8 is a perspective view of a female screw member and surrounding components according to a fourth modification.
Figure 9:
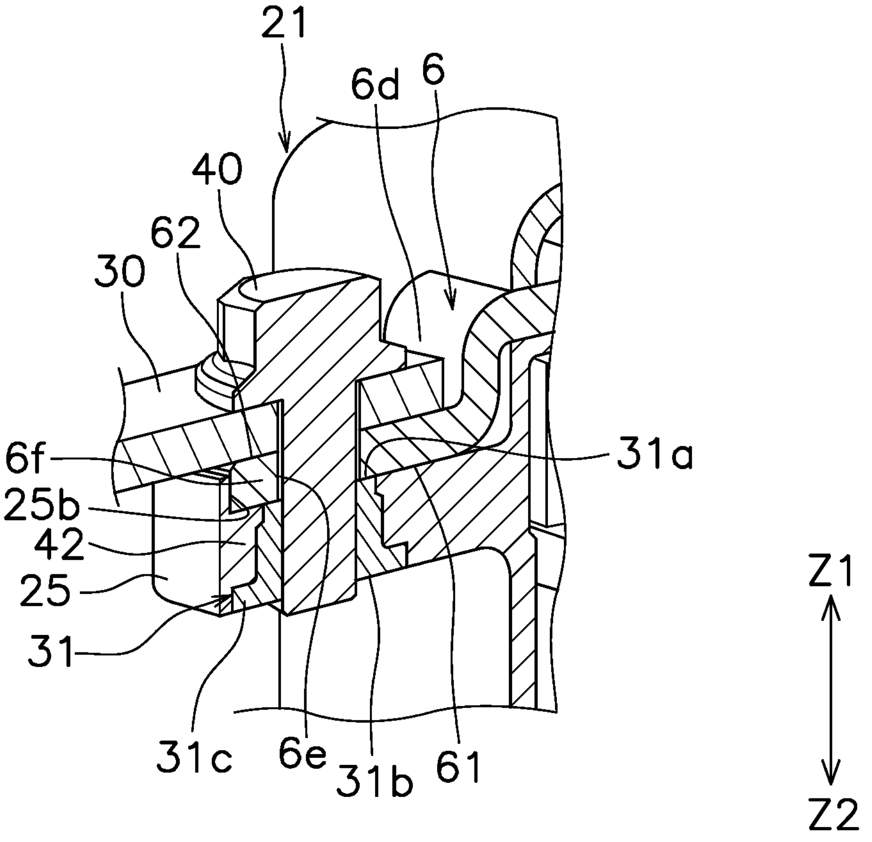
FIG. 9 is a cross-sectional perspective view of a female screw member and surrounding components according to the fourth modification.

FIG. 8 is a perspective view illustrating the female screw member 31 and the surrounding region according to a fourth modification. FIG. 9 is a cross-sectional perspective view illustrating the female screw member 31 and the surrounding region according to the fourth modification. In the fourth modification, the side surface 63 of the external connecting portion 6*e* is, at least partially, held on the outer support portion 25. Specifically, the outer support portion 25 includes a retaining groove 25*b* for retaining the side surface 63. The retaining groove 25*b* is formed along the shape of the side surface 63. The retaining groove 25*b* covers the left side, the front side, and the rear side of the side surface 63. Other configurations are similar to those of the first modification. Note that the outer support portion 25 may have a shape partially covering the upper surface of the external connecting portion 6*e*.

REFERENCE NUMERALS

2 Case
6 Fixed terminal
6*e* External connecting portion
6*f* Screw insertion hole
21 Case body
Outer support portion
25*a* Retaining groove
31 Femail screw member
31*c* Flange portion
42 Held portion
61 first surface
62 Second surface
63 Side
100 Electromagnetic relay

The invention claimed is:

1. An electromagnetic relay, comprising:

a case;

a fixed terminal having a plate-like shape, the fixed terminal including an internal portion disposed inside the case and an external connecting portion integrated with the internal portion, the external connecting portion having a first surface, a second surface opposite the first surface, and a screw insertion hole that is exposed to an outside from the case, the external connecting portion being configured to be screwed to an external terminal; and a female screw member prevented from rotating by the case, the female screw member being configured to screw the external connecting portion to the external terminal, the case including a held portion configured to be held between the external connecting portion of the fixed terminal and the female screw member in a direction of penetration of the screw insertion hole, the direction including a first direction from the female screw member toward the external connecting portion and a second direction from the external connecting portion toward the female screw member, the first surface of the external connecting portion contacting the held portion, the second surface being configured as an exposed surface for contacting the external terminal, and the held portion being configured to be held between the first surface of the external connecting portion and the female screw member.

2. The electromagnetic relay according to claim 1, wherein the female screw member includes a flange portion having an outer diameter larger than an outer diameter of an end surface of the female screw member in the first direction, and the held portion of the case is held between the external connecting portion of the fixed terminal and the flange portion of the female screw member in the direction of penetration of the screw insertion hole.

3. The electromagnetic relay according to claim 1, wherein the female screw member has an end surface exposed to the outside from the case in the second direction.

4. The electromagnetic relay according to claim 1, wherein the case includes a case body and an outer support portion, the outer support portion protrudes from the case body to be in contact with the external connecting portion, and the female screw member is disposed in the outer support portion.

5. The electromagnetic relay according to claim 4, wherein the external connecting portion of the fixed terminal includes a first surface contacting the held portion, a second surface opposite the first surface, and a side surface between the first surface and the second surface, and the side surface is, at least partially, held by the outer support portion of the case.

6. The electromagnetic relay according to claim 4, wherein the outer support portion of the case includes a retaining groove to retain the female screw member, the retaining groove having an opening to insert to the female screw member, the opening opened in a direction intersecting the direction of penetrating of the screw insertion hole.

7. The electromagnetic relay according to claim 1, wherein the case is comprised of resin.

8. The electromagnetic relay according to claim 1, wherein the female screw member is a separate body from the fixed terminal.

9. The electromagnetic relay according to claim 1, wherein the external connecting portion of the fixed terminal is disposed at a position without overlapping with an inner portion of the fixed terminal when viewed from the direction of penetration of the screw insertion hole.

10. The electromagnetic relay according to claim 1, wherein the female screw member is disposed at a position without overlapping with an inner portion of the fixed terminal when viewed from the direction of penetration of the screw insertion hole.

11. The electromagnetic relay according to claim 1, wherein the female screw member is spaced apart from an inner portion of the fixed terminal.

* * * * *